(12) United States Patent
Suzuki (10) Patent No.: US 10,065,268 B2
(45) Date of Patent: Sep. 4, 2018

(54) LASER PROCESSING SYSTEM OPERATING BY PLURALITY OF OPERATION MODES

(71) Applicant: FANUC CORPORATION, Minamitsuru-gun, Yamanashi (JP)

(72) Inventor: Kazuhiro Suzuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 328 days.

(21) Appl. No.: 15/085,218

(22) Filed: Mar. 30, 2016

(65) Prior Publication Data

US 2016/0288255 A1 Oct. 6, 2016

(30) Foreign Application Priority Data

Mar. 31, 2015 (JP) .................................. 2015-073532

(51) Int. Cl.
*B23K 26/08* (2014.01)
*B23K 26/38* (2014.01)
*B23K 26/04* (2014.01)

(52) U.S. Cl.
CPC ............ *B23K 26/08* (2013.01); *B23K 26/048* (2013.01); *B23K 26/38* (2013.01)

(58) Field of Classification Search
CPC ....... B23K 26/08; B23K 26/38; B23K 26/048
USPC ........................... 219/121.61–121.72, 121.83
See application file for complete search history.

(56) References Cited

U.S. PATENT DOCUMENTS

| | | | |
|---|---|---|---|
| 9,407,054 B2 | 8/2016 | Miyata | |
| 2013/0170514 A1* | 7/2013 | Sugiyama | ............... H01S 3/041 372/34 |
| 2015/0158123 A1 | 6/2015 | Kyoto | |

FOREIGN PATENT DOCUMENTS

| | | | |
|---|---|---|---|
| CN | 104096977 A | | 10/2014 |
| JP | 02235588 A | * | 9/1980 |
| JP | 2000271767 A | | 10/2000 |
| JP | 2012064636 A | | 3/2012 |
| JP | 2012171084 A | | 9/2012 |
| JP | 2014-205172 A | | 10/2014 |
| JP | 2015104741 A | | 6/2015 |
| WO | 2014038241 A1 | | 3/2014 |

OTHER PUBLICATIONS

Notification of Reasons for Refusal for Japanese Application No. 2015-073532, dated Jun. 29, 2017, including English translation, 6 pages.

* cited by examiner

*Primary Examiner* — Samuel M Heinrich
(74) *Attorney, Agent, or Firm* — RatnerPrestia (57) ABSTRACT

A laser processing system able to realize both reduction of the power consumption and shortening of the cycle time. The laser processing system is provided with a laser oscillator, a laser processing machine which has a movement mechanism which makes the irradiation position of the laser light on the workpiece move, a mode switching part which switches an operation mode of the laser oscillator between a standard-standby mode and an energy saving mode, a movement controller controlling the movement mechanism so as to place the irradiation position at a process start point placed at a non-product region of the workpiece, and a switching controller controlling the mode switching part to switch the operation mode from the energy saving mode to the standard-standby mode when placing the irradiation position at the process start point.

5 Claims, 9 Drawing Sheets

LASER PROCESSING SYSTEM OPERATING BY PLURALITY OF OPERATION MODES

BACKGROUND OF THE INVENTION

1. Field of the Invention

The invention relates to a laser processing system operating by a plurality of operation modes.

2. Description of the Related Art

Known in the art has been a laser processing system switching an operation mode between a standard-standby mode carrying out a base discharge and an energy saving mode with a smaller power consumption than the standard-standby mode in accordance with progress in the laser processing process from the viewpoint of reducing the power consumption (for example, Japanese Patent Publication No. 2014-205172).

In such a laser processing system, realization of both reduction of the power consumption and shortening of the cycle time has been sought.

SUMMARY OF INVENTION

In an aspect of the invention, the laser processing system comprises a laser oscillator which generates laser light and a laser processing machine which irradiates laser light generated by the laser oscillator onto a workpiece so as to process the workpiece. The laser processing machine includes a movement mechanism for moving an irradiation position of laser light on the workpiece.

The laser processing system comprises a mode switching part which switches an operation mode which determines an electric power supplied to the laser oscillator between a standard-standby mode for making the laser oscillator execute a base discharge prior to a laser processing and an energy saving mode in which the power consumption is smaller than that in the standard-standby mode.

The laser processing system comprises a movement controller which controls the movement mechanism so as to arrange the irradiation position at a process start point arranged at a non-product region of the workpiece other than a product region of the workpiece used as a product and a switching controller which controls the mode switching part so as to switch the operation mode from the energy saving mode to the standard-standby mode when the irradiation position is arranged at the process start point.

The laser processing machine may include a table on which the workpiece is placed, and a nozzle which emits laser light generated by the laser oscillator toward the table. The movement mechanism may move the nozzle and the table move relative to each other.

The switching controller may switch the operation mode from the energy saving mode to the standard-standby mode when receiving a gap control start command for starting to control the gap dimension between the nozzle and the table.

The switching controller may switch the operation mode from the energy saving mode to the standard-standby mode when receiving a piercing command for piercing a hole at the process start point by laser light.

The laser processing machine may further include a shutter which opens and closes a path of laser light emitted from the laser oscillator. The laser processing system may further comprise a shutter controller which controls an operation of the shutter. The shutter controller does not close the shutter when the operation mode is switched from the energy saving mode to the standard-standby mode.

BRIEF DESCRIPTION OF THE DRAWINGS

These and other objects, features, and advantages of the invention will be clarified with reference to the detailed description of illustrative embodiments of the invention shown in the attached drawings, in which.

DETAILED DESCRIPTION

Below, embodiments of the invention will be explained in detail based on the drawings. First, referring to FIG. 1 and FIG. 2, a laser processing system 10 according to an embodiment of the invention will be explained. The laser processing system 10 includes a laser oscillator 12, a laser processing machine 14, and a controller 16.

Figure 2:
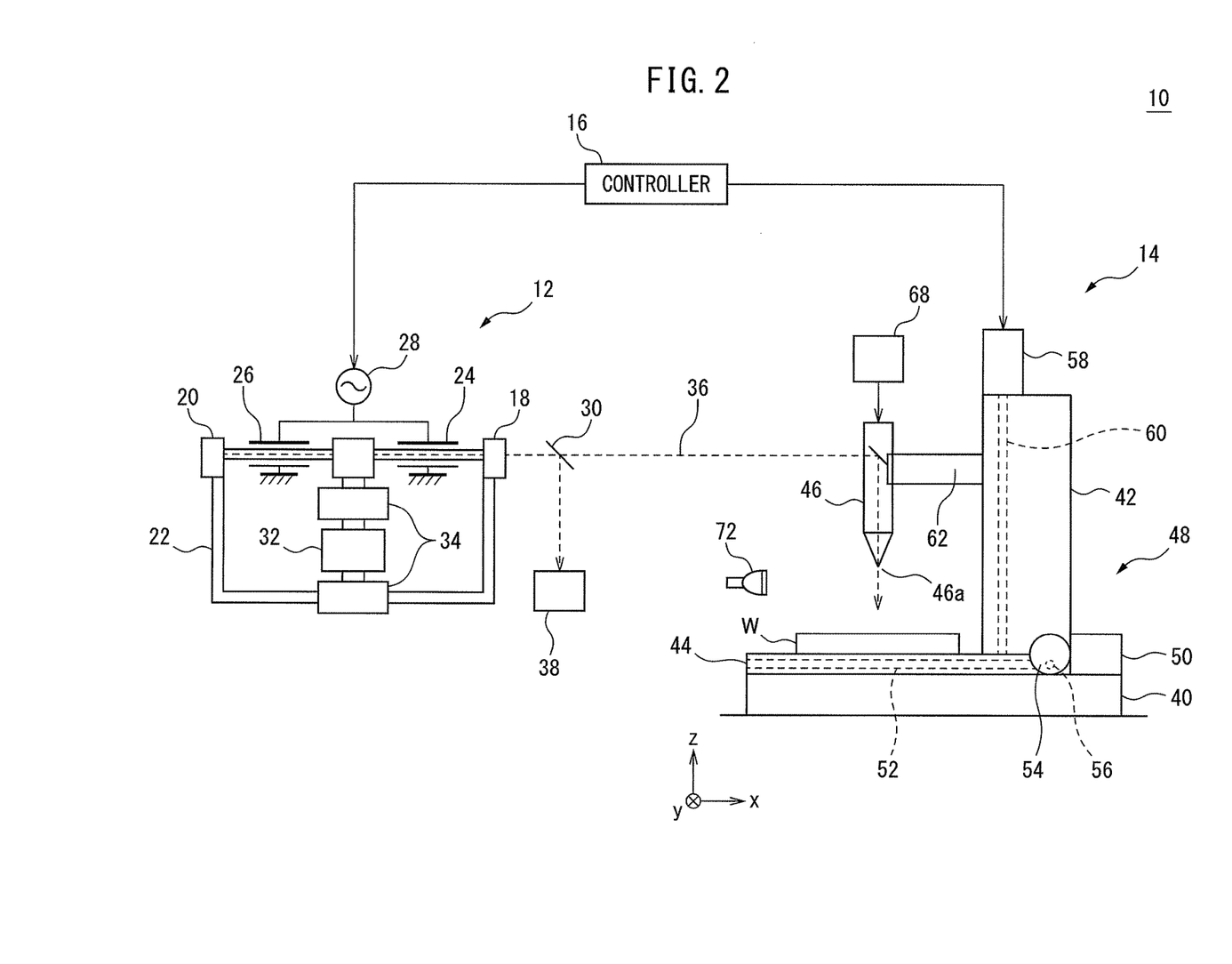
FIG. 2 is a view illustrating the configuration of the laser processing system shown in FIG. 1.

As shown in FIG. 2, the laser oscillator 12 includes an output mirror 18, a rear mirror 20, a laser medium flow path 22, a first discharge tube 24, a second discharge tube 26, a discharge power source 28, and a shutter 30. The output mirror 18 and rear mirror 20 are arranged opposite to each other. The output mirror 18 is comprised of a partial reflection mirror (a so-called "half mirror") having a 99% or more reflectance, while the rear mirror 20 is comprised of a total reflection mirror.

The first discharge tube 24 and second discharge tube 26 are arranged between the output mirror 18 and the rear mirror 20. Each of the first discharge tube 24 and the second discharge tube 26 is provided with a main electrode and an auxiliary electrode (both not shown).

The laser medium flow path 22 is in fluid communication with the insides of the first discharge tube 24 and second discharge tube 26. The laser medium flow path 22 can circulate a laser medium, such as carbon dioxide gas, inside thereof. A blower 32 and heat exchangers 34 are provided at the laser medium flow path 22.

The blower 32 is comprised of e.g. an electric fan, and causes the laser medium to flow in the laser medium flow path 22. The heat exchangers 34 are respectively arranged at the upstream and downstream of the blower 32, and cool the laser medium passing through them.

The discharge power source 28 supplies electric power to the first discharge tube 24 and second discharge tube 26. Specifically, the discharge power source 28 applies voltage to the main electrodes and auxiliary electrodes provided at the first discharge tube 24 and the second discharge tube 26.

When the discharge power source 28 applies voltage to the main electrodes of the first discharge tube 24 and the second discharge tube 26, the laser medium in the first discharge tube 24 and the second discharge tube 26 is excited so as to generate a main discharge, thereby laser light is generated. The generated laser light is amplified by optical resonance generated between the output mirror 18 and the rear mirror 20, and part of the laser light is emitted as laser light 36 from the output mirror 18.

On the other hand, when the discharge power source 28 applies voltage to the auxiliary electrodes of the first discharge tube 24 and the second discharge tube 26, a base discharge is generated. When the base discharge is generated, the first discharge tube 24 and the second discharge tube 26 generate a laser light having a smaller laser power than the above-mentioned main discharge.

The shutter 30 opens and closes the path of laser light 36 emitted from the output mirror 18 in accordance with a command from the controller 16. When the path of laser light 36 is closed by the shutter 30, laser light 36 is guided to the beam absorber 38 and absorbed by the beam absorber 38.

The laser processing machine 14 irradiates laser light 36 generated by the laser oscillator 12 onto the workpiece W so as to process the workpiece W. Specifically, the laser processing machine 14 includes a base 40, a column 42, a table 44, a nozzle 46, a movement mechanism 48, and a gap sensor 72.

The base 40 is fixed on the floor of the work cell. The column 42 extends from the base 40 in the z-axis plus direction in FIG. 2. The table 44 is arranged above the base 40 so as to be movable in the x-axis and y-axis directions in FIG. 2.

The nozzle 46 is attached to the column 42 via a nozzle holding part 62 so as to be movable in the z-axis direction. The nozzle 46 receives laser light 36 emitted from the output mirror 18, focuses received laser light 36 and emits it toward the table 44.

The workpiece W placed on the table 44 is processed by laser light 36 emitted from the nozzle 46 (e.g., laser piercing, laser cutting, etc.). An assist gas supply part 68 is connected to the nozzle 46. When the laser processing is executed, the assist gas supply part 68 supplies assist gas to the nozzle 46.

The movement mechanism 48 moves the nozzle 46 and table 44 relative to each other so as to move the irradiation position of laser light 36 relative to the workpiece W. Specifically, the movement mechanism 48 includes a first motor 50, a first ball-screw mechanism 52, a second motor 54, a second ball-screw mechanism 56, a third motor 58, and a third ball-screw mechanism 60.

The first motor 50 is fastened on the base 40, and rotates the output shaft thereof in accordance with a command from the controller 16. The first ball-screw mechanism 52 is mechanically connected to the table 44 and the output shaft of the first motor 50.

The first ball-screw mechanism 52 converts the rotary motion of the output shaft of the first motor 50 to the reciprocating motion in the x-axis direction so as to move the table 44 in the x-axis direction in response to the rotation of the output shaft of the first motor 50.

Similarly, the second motor 54 is fastened on the base 40, and rotates the output shaft thereof in accordance with a command from the controller 16. The second ball-screw mechanism 56 is mechanically connected to the table 44 and the output shaft of the second motor 54.

The second ball-screw mechanism 56 converts the rotary motion of the output shaft of the second motor 54 to the reciprocating motion in the y-axis direction so as to move the table 44 in the y-axis direction in response to the rotation of the output shaft of the second motor 54.

On the other hand, the third motor 58 is fastened on the column 42, and rotates the output shaft thereof in accordance with a command from the controller 16. The third ball-screw mechanism 60 is mechanically connected to the nozzle holding part 62 holding the nozzle 46 and the output shaft of the third motor 58.

The third ball-screw mechanism 60 converts the rotary motion of the output shaft of the third motor 58 to the reciprocating motion in the z-axis direction so as to move the nozzle holding part 62 (i.e., the nozzle 46) in the z-axis direction in response to the rotation of the output shaft of the third motor 58. Each of the first motor 50, the second motor 54, and the third motor 58 is comprised of e.g. a servo motor.

The gap sensor 72 detects the gap dimension between the workpiece W and the laser emitting port 46a at the front end of the nozzle 46 in a non-contact manner, in accordance with a command from the controller 16. The gap sensor 72 is comprised of a non-contact sensor such as a displacement sensor, CCD sensor, CMOS sensor or other image sensor. The gap sensor 72 detects the gap dimension between the laser emitting port 46a and the workpiece W and sends it to the controller 16.

Figure 1:
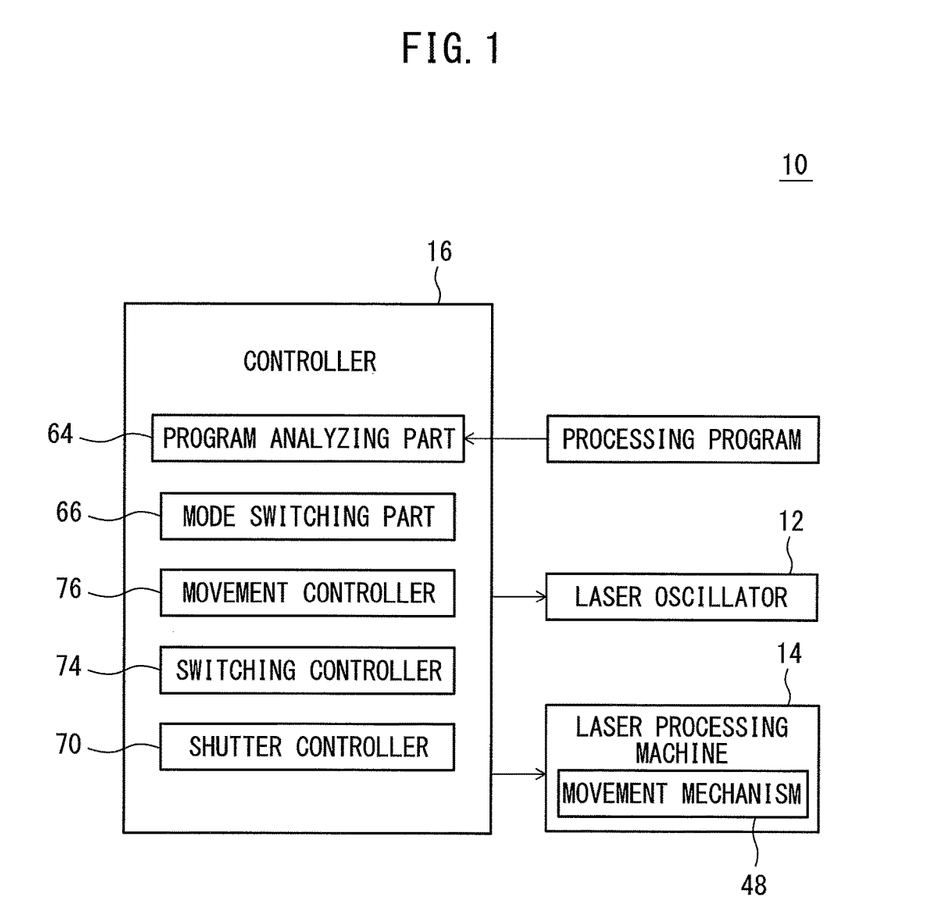
FIG. 1 is a block diagram of a laser processing system according to an embodiment of the invention.

The controller 16 has a function of a program analyzing part 64 (FIG. 1). The controller 16 functions as the program analyzing part 64 to read out the processing program and analyze the various commands included in the processing program.

Then, the controller 16 sends commands to respective elements of the laser oscillator 12 and laser processing machine 14 in response to the result of analysis. Note that, the processing program is pre-stored in a storage (not shown) built in the controller 16, for example.

The controller 16 has a function of a mode switching part 66. The controller 16 functions as the mode switching part 66 to switch the operation mode of the laser oscillator 12 between a standard-standby mode and an energy saving mode. These operation modes determine the electric power supplied to the laser oscillator 12.

Specifically, the standard-standby mode is an operation mode for making the laser oscillator 12 carry out the base discharge. In this standard-standby mode, the controller 16 sends a command to the discharge power source 28 so as to stop applying voltage to the main electrodes of the first discharge tube 24 and the second discharge tube 26, while apply voltage to the auxiliary electrodes of to the first discharge tube 24 and the second discharge tube 26.

Due to this, the first discharge tube 24 and the second discharge tube 26 carry out the base discharges. The power consumption at the laser oscillator 12 in the standard-standby mode is smaller than the power consumption in the operation mode in which the first discharge tube 24 and the second discharge tube 26 carry out the main discharges.

In the energy saving mode, the controller 16 stops to apply voltage to the main electrodes and auxiliary electrodes of the first discharge tube 24 and the second discharge tube 26, thereby stops both of the main discharges and the base discharges at the first discharge tube 24 and the second discharge tube 26.

The energy saving mode is an operation mode for reducing the power consumption at the laser oscillator 12 to the minimum extent. The power consumption at the laser oscillator 12 in the energy saving mode is smaller than the power consumption at the laser oscillator 12 in the standard-standby mode.

The controller 16 has a function of a shutter controller 70 (FIG. 1). The controller 16 functions as the shutter controller 70 to send a command to the shutter 30 so as to operate the shutter 30 to open and close the path of laser light 36 emitted from the output mirror 18.

Next, referring to FIG. 1 to FIG. 5, an example of the operation of the laser processing system 10 will be explained. The laser processing system 10 sequentially executes a plurality of laser processing operations (e.g., laser-cutting the workpiece W) in accordance with a processing program.

Figure 3:
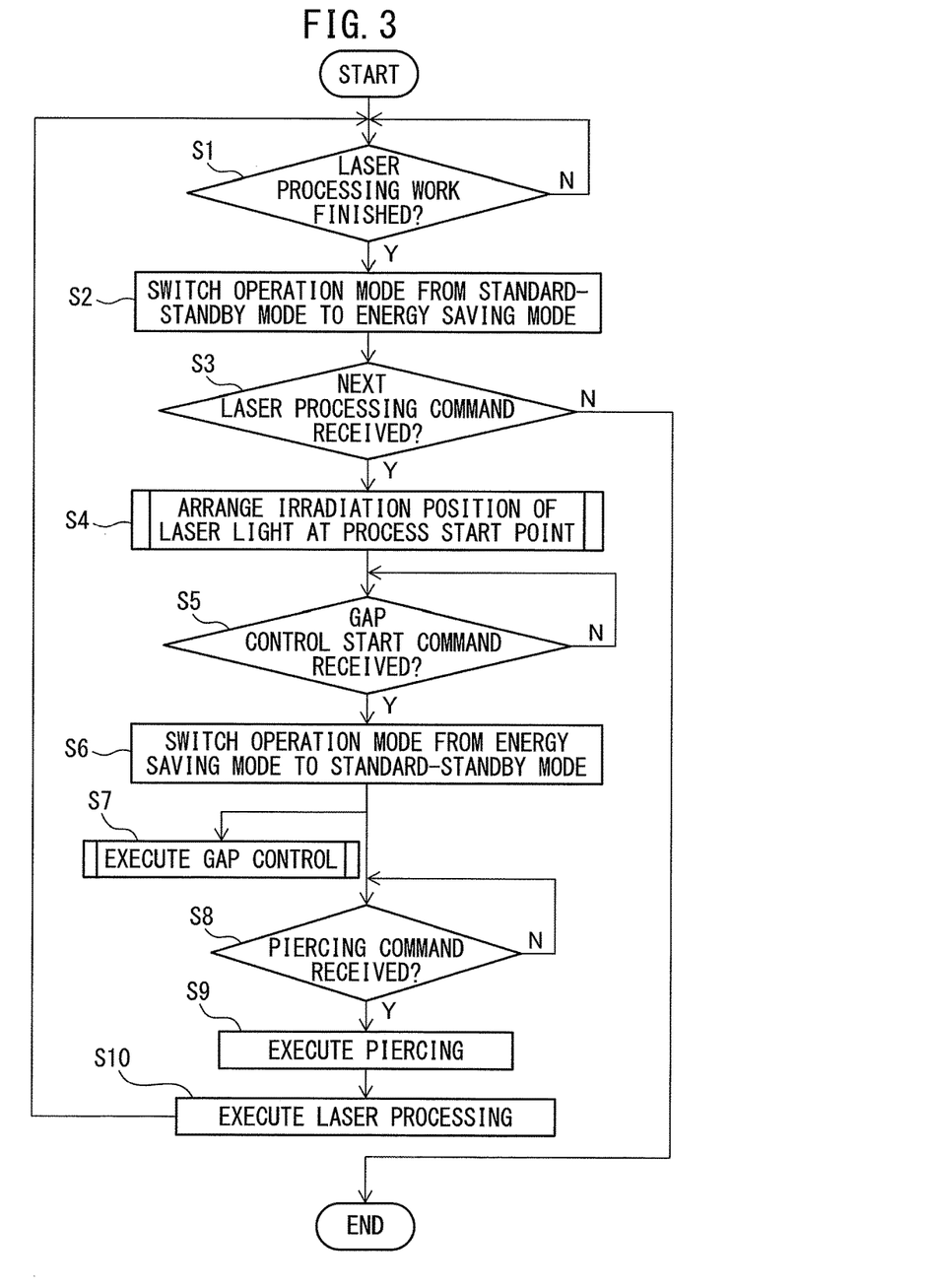
FIG. 3 is a flow chart illustrating an example of the operation flow of the laser processing system shown in FIG. 1.

The flow shown in FIG. 3 is started when the laser processing system 10 executes one laser processing operation. At step S1, the controller 16 determines whether the laser processing work has finished.

Specifically, the controller 16 functions as the program analyzing part 64 to analyze the processing program, and determines whether the currently-executed laser processing work has ended. When the controller 16 determines that the laser processing work has ended (i.e., determines "YES"), the controller 16 proceeds to step S2.

On the other hand, when the controller 16 determines that the laser processing work has not ended (i.e., determines "NO"), the controller 16 executes the laser processing operation in accordance with the processing program until the laser processing operation is completed.

At step S2, the controller 16 functions as the mode switching part 66 to switch the operation mode of the laser oscillator 12 from the standard-standby mode to the energy saving mode. Specifically, the controller 16 sends a command to the discharge power source 28 so as to stop the supply of voltage to the main electrodes and auxiliary electrodes of the first discharge tube 24 and the second discharge tube 26, thereby shut down the main discharge and base discharge.

At step S3, the controller 16 determines whether it has received next laser processing command. Specifically, the controller 16 functions as the program analyzing part 64 to analyze the processing program and determine whether the controller 16 has received the next laser processing command from the processing program.

When the controller 16 determines that it has received the next laser processing command (i.e., determines "YES"), the controller 16 proceeds to step S3.

On the other hand, when the controller 16 determines that it has not received the next laser processing command (i.e., determines "NO"), the controller 16 ends the flow shown in FIG. 3.

At step S4, the controller 16 arranges the irradiation position of laser light 36 from the laser processing machine 14 to the workpiece W at a process start point. The process start point is arranged at a non-product region of the workpiece W other than a product region of the workpiece W used for a product. Step S4 will be explained with reference to FIG. 4.

Figure 4:
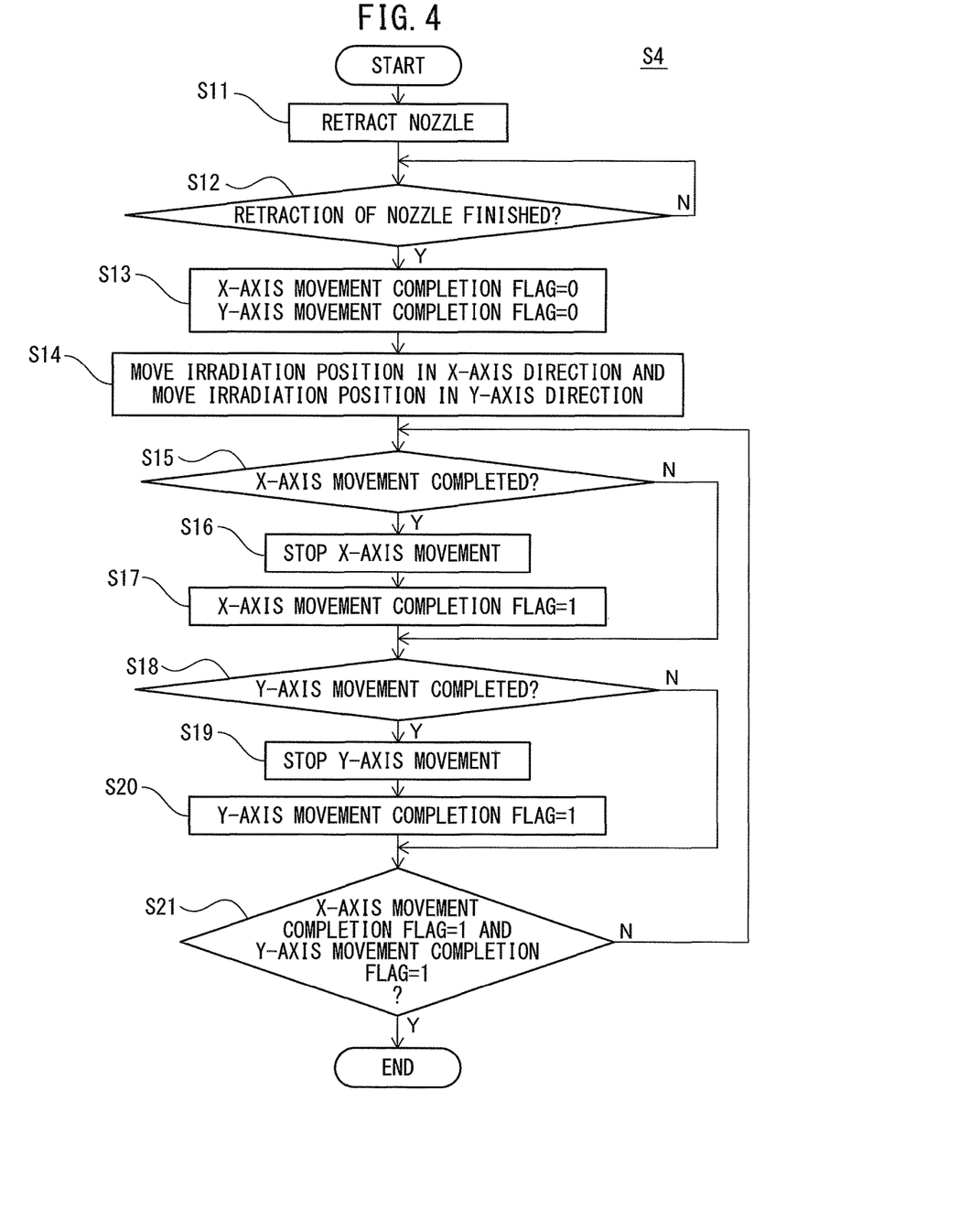
FIG. 4 is a flow chart illustrating the operation flow of step S4 in FIG. 3.

After step S4 is started, at step S11, the controller 16 retracts the nozzle 46 in a direction away from the table 40 (i.e., the z-axis plus direction in FIG. 2). Specifically, the controller 16 sends a command to the third motor 58 so as to drive the third motor 58 to rotate. The third motor 58 moves the nozzle 46 in the z-axis plus direction via the third ball-screw mechanism 60.

At step S12, the controller 16 determines whether the retraction of the nozzle 46 has been finished. For example, the controller 16 acquires the rotation number of the third motor 58 from an encoder (not shown) built in the third motor 58, and determines that the retraction of the nozzle 46 has been finished when the third motor 58 has rotated by the predetermined number of rotations. Then, the controller 16 stops the rotation of the third motor 58. The above-mentioned predetermined number of rotations may be included in the processing program.

When the controller 16 determines that the retraction of the nozzle 46 has been finished (i.e., determines "YES"), the controller 16 proceeds to step S13. On the other hand, when the controller 16 determines that the retraction of the nozzle 46 has not been finished (i.e., determines "NO"), the controller 16 loops step S12.

At step S13, the controller 16 sets both the x-axis movement completion flag and the y-axis movement completion flag to "0". The x-axis movement completion flag is a flag which indicates that the movement in the x-axis direction of the irradiation position of laser light 36 on the workpiece W has been completed. Further, the y-axis movement completion flag is a flag which indicates that the movement in the y-axis direction of the irradiation position of the laser light 36 on the workpiece W has been completed.

At step S14, the controller 16 moves the irradiation position of the laser light 36 on the workpiece W relatively in the x-axis direction. As an example, the controller 16 acquires the x-axis direction coordinate $x_1$ of the process start point at the time of start of step S14 and the x-axis direction coordinate $x_2$ of the laser light 36 emitted from the nozzle 46 (or of the laser emitting point 46a) from the processing program, and calculates the difference $\delta_x = x_1 - x_2$ between the two.

Then, the controller 16 rotates the first motor 50 so as to move the table 44 in the x-axis direction so that the difference $\delta_x$ becomes zero. The first motor 50 moves the table 44 in the x-axis direction via the first ball-screw mechanism 52 in accordance with a command from the controller 16.

In addition, at this step S14, the controller 16 moves the irradiation position of laser light 36 on the workpiece W relatively in the y-axis direction. As an example, the controller 16 acquires the y-axis direction coordinate $y_1$ of the process start point at the time of start of step S14 and the y-axis direction coordinate $y_2$ of the laser light 36 emitted from the nozzle 46 (or of the laser emitting point 46a) from the processing program, and calculates the difference $\delta_y = y_1 - y_2$ between the two.

The controller 16 rotates the second motor 54 so as to move the table 44 in the y-axis direction so that the difference $\delta_y$ becomes zero. The second motor 54 moves the table 44 in the y-axis direction via the second ball-screw mechanism 56 in accordance with a command from the controller 16.

At step S15, the controller 16 determines whether the movement of the irradiation position of the laser light 36 in the x-axis direction has been finished. Specifically, the controller 16 determines that the movement of the irradiation position of the laser light 36 in the x-axis direction has been finished when determining that the position in the x-axis direction of the laser light 36 emitted from the nozzle 46 (or of the laser emitting port 46a) coincides with the position in the x-axis direction of the process start point on the workpiece W.

As an example, the controller 16 determines that the position in the x-axis direction of the laser light 36 fired from the nozzle 46 (or of the laser emitting port 46a) coincides with the position in the x-axis direction of the process start point on the workpiece W, when determining that the above difference $\delta_x$ has been zero (or within the range between predetermined threshold values, e.g., $-0.01 \leq \delta_x \leq 0.01$).

When the controller 16 determines that the movement of the irradiation position in the x-axis direction has been finished (i.e., determines "YES"), the controller 16 proceeds to step S16. On the other hand, when the controller 16 determines that the movement of the irradiation position has not been finished (i.e., determines "NO"), the controller 16 proceeds to step S18.

At step S16, the controller 16 stops the movement in the x-axis direction of the irradiation position of the laser light 36 on the workpiece W. Specifically, the controller 16 sends a command to the first motor 50 so as to stop the first motor 50.

At step S17, the controller 16 sets the x-axis movement completion flag to "1".

At step S18, the controller 16 determines whether the movement of the irradiation position of the laser light 36 in the y-axis direction has been finished. Specifically, the controller 16 determines that the movement of the irradiation position in the y-axis direction has been finished, when determining that the position in the y-axis direction of the laser light 36 fired from the nozzle 46 (or of the laser emitting port 46a) coincides with the position in the y-axis direction of the process start point on the workpiece W.

As an example, the controller 16 determines that the position in the y-axis direction of the laser light 36 fired from the nozzle 46 (or of the laser emitting port 46a) coincides with the position in the y-axis direction of the process start point on the workpiece W, when determining that the above difference $\delta_y$ is zero. When the controller 16 determines that the movement of the irradiation position in the y-axis direction has been finished (i.e., determines "YES"), the controller 16 proceeds to step S19. On the other hand, when the controller 16 determines that the movement of the irradiation position in the y-axis direction has not been finished (i.e., determines "NO"), the controller 16 proceeds to step S21.

At step S19, the controller 16 stops the movement in the y-axis direction of the irradiation position of the laser light 36 on the workpiece W. Specifically, the controller 16 sends a command to the second motor 54 so as to stop the second motor 54.

At step S20, the controller 16 sets the y-axis movement completion flag to "1".

At step S21, the controller 16 determines whether both of the x-axis movement completion flag and the y-axis movement completion flag have been set to "1". When the controller 16 determines that both the x-axis movement completion flag and the y-axis movement completion flag have been set to "1" (i.e., determines "YES"), the controller 16 ends the flow shown in FIG. 4. On the other hand, when the controller 16 determines that at least one of the x-axis movement completion flag and y-axis movement completion flag has not been set to "1" (i.e., determines "NO"), the controller 16 returns to step S15.

In this step S4, the controller 16 controls the movement mechanism 48 so as to arrange the irradiation position of laser light 36 on the workpiece W at the process start point on the workpiece W. Therefore, the controller 16 functions as a movement controller 76 (FIG. 1) which controls the movement mechanism 48 so as to arrange the irradiation position of laser light 36 at the process start point.

Referring again to FIG. 3, at step S5, the controller 16 determines whether it has received a gap control start command. In the laser processing system 10, it is necessary to appropriately control the gap dimension between the nozzle 46 and the workpiece W when the laser processing on the workpiece W, such as laser-piercing or laser-cutting, is executed.

The gap control start command is a command for starting the control of the gap dimension between the nozzle 46 and the workpiece W (so-called "gap control"), which is a command included in the processing program.

When the controller 16 determines that it has received the gap control start command (i.e., determines "YES"), the controller 16 proceeds to step S6. On the other hand, when determining that the gap control start command has not received, the controller 16 loops step S5.

At step S6, the controller 16 functions as the mode switching part 66 to switch the operation mode of the laser oscillator 12 from the energy saving mode to the standard-standby mode. Specifically, the controller 16 sends a command to the discharge power source 28 so as to supplies voltage to the auxiliary electrodes of the first discharge tube 24 and the second discharge tube 26 to start the base discharge.

At this time, due to the above step S4, the laser light 36 emitted from the laser processing machine 14 is irradiated on the process start point in the workpiece W. Thus, in this embodiment, the controller 16 has a function of a switching controller 74 (FIG. 1) which switches the operation mode from the energy saving mode to the standard-standby mode when the laser light 36 emitted from the laser processing machine 14 can be irradiated on the process start point in the workpiece W.

Figure 5:
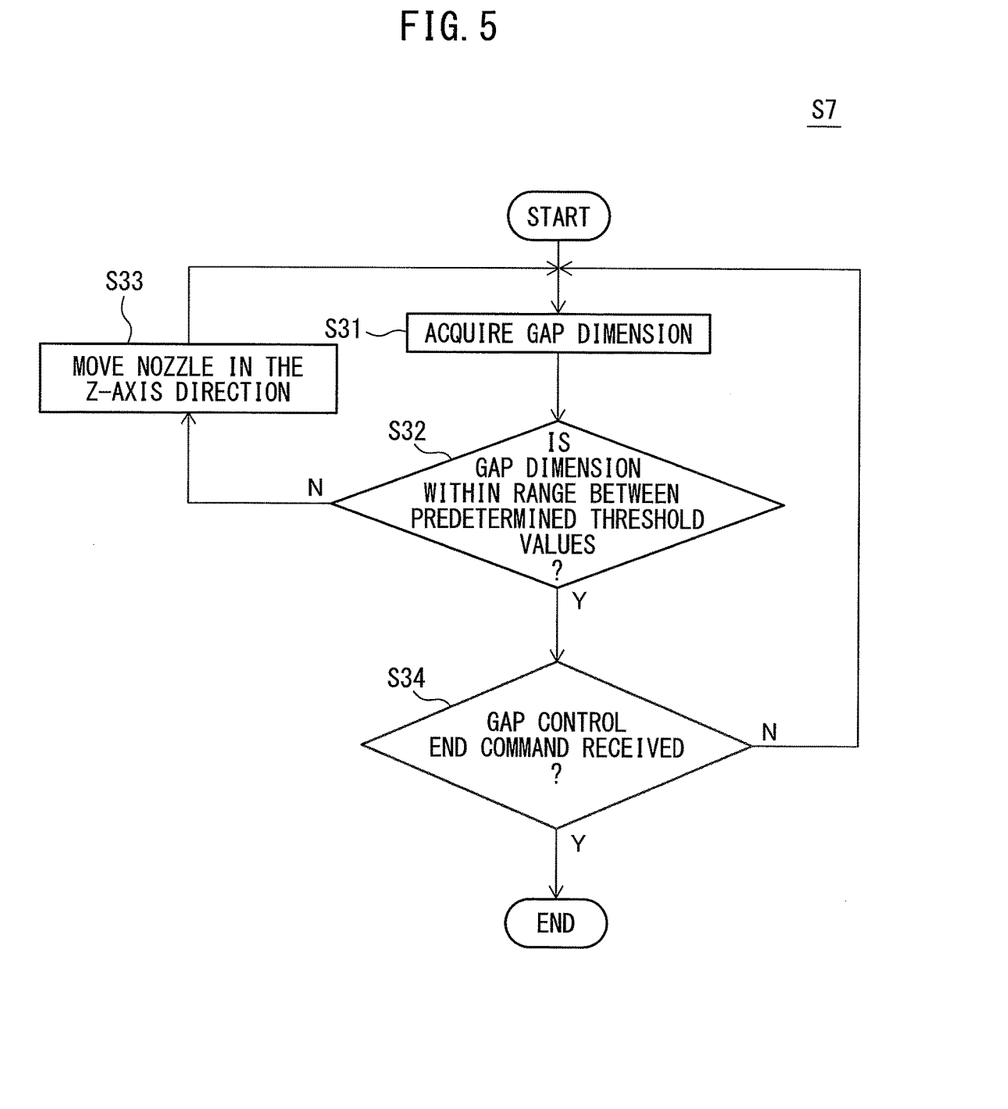
FIG. 5 is a flow chart illustrating the operation flow of step S7 in FIG. 3.

At step S7, the controller 16 executes the gap control. This step S7 will be explained with reference to FIG. 5. After the flow of FIG. 5 is started, at step S31, the controller 16 acquires the gap dimension between the laser emitting port 46a and the workpiece W from the gap sensor 72.

At step S32, the controller 16 determines whether the gap dimension is within the range between predetermined threshold values. For example, the predetermined threshold values are pre-stored in the storage built in the controller 16. The controller 16 reads out the predetermined threshold values from the storage, and compares the gap dimension acquired at step S31 with the predetermined threshold values.

When the controller 16 determines that the gap dimension is within the range between the predetermined threshold values (i.e., determines "YES"), the controller 16 proceeds to step S34. On the other hand, when the controller 16 determines that the gap dimension is out of the range between the predetermined threshold values (i.e., determines "NO"), the controller 16 proceeds to step S33.

At step S33, the controller 16 moves the nozzle 46 in the z-axis direction. Specifically, the controller 16 moves the nozzle 46 in a direction away from the table 40 (i.e., the z-axis plus direction in FIG. 2) or a direction toward the table 40 (i.e., the z-axis minus direction in FIG. 2) so that the gap dimension falls within the range between the predetermined threshold values. After step S33, the controller 16 returns to step S31.

At step S34, the controller 16 determines whether it has received a gap control end command. The gap control end command is a command for ending the control of the gap dimension, which is a command included in the processing program.

When the controller 16 determines that it has received the gap control end command (i.e., determines "YES"), the controller 16 ends the flow shown in FIG. 5. On the other hand, when the controller 16 determines that it has not received the gap control start command, the controller 16 returns to step S31.

The flow of the gap control shown in FIG. 5 is executed in parallel during the piercing in step S9 and the laser processing in step S10, which are explained below, are executed. By this, the gap dimension between the nozzle 46 and the workpiece W is appropriately controlled during the piercing and the laser processing.

Referring again to FIG. 3, at step S8, the controller 16 determines whether it has received a piercing command. The piercing command is a command for piercing a hole at the process start point on the workpiece W, which is one of commands included in the processing program.

The piercing is executed as a preparatory operation for laser-cutting the workpiece W. The hole formed by the piercing is used as a start point for laser-cutting the workpiece W.

At this step S8, the controller 16 functions as the program analyzing part 64 to analyze the processing program, and determine whether the controller 16 has received the piercing command from the processing program.

When the controller 16 determines that it has received the piercing command (i.e., determines "YES"), the controller 16 proceeds to step S9. On the other hand, when the controller 16 determines that it has not received the piercing command (i.e., determines "NO"), the controller 16 loops step S8.

At step S9, the controller 16 executes the piercing. Specifically, the controller 16 controls the laser oscillator 12 so as to emit laser light 36 for piercing from the laser oscillator 12. The laser light 36 emitted from the laser oscillator 12 passes through the nozzle 46, and is irradiated on the process start point on the workpiece W. As a result, a hole is formed at the process start point in the workpiece W.

At step S10, the controller 16 carries out the laser process, such as laser-cutting, on the workpiece W. After step S10, the controller 16 returns to step S1.

Figure 6:
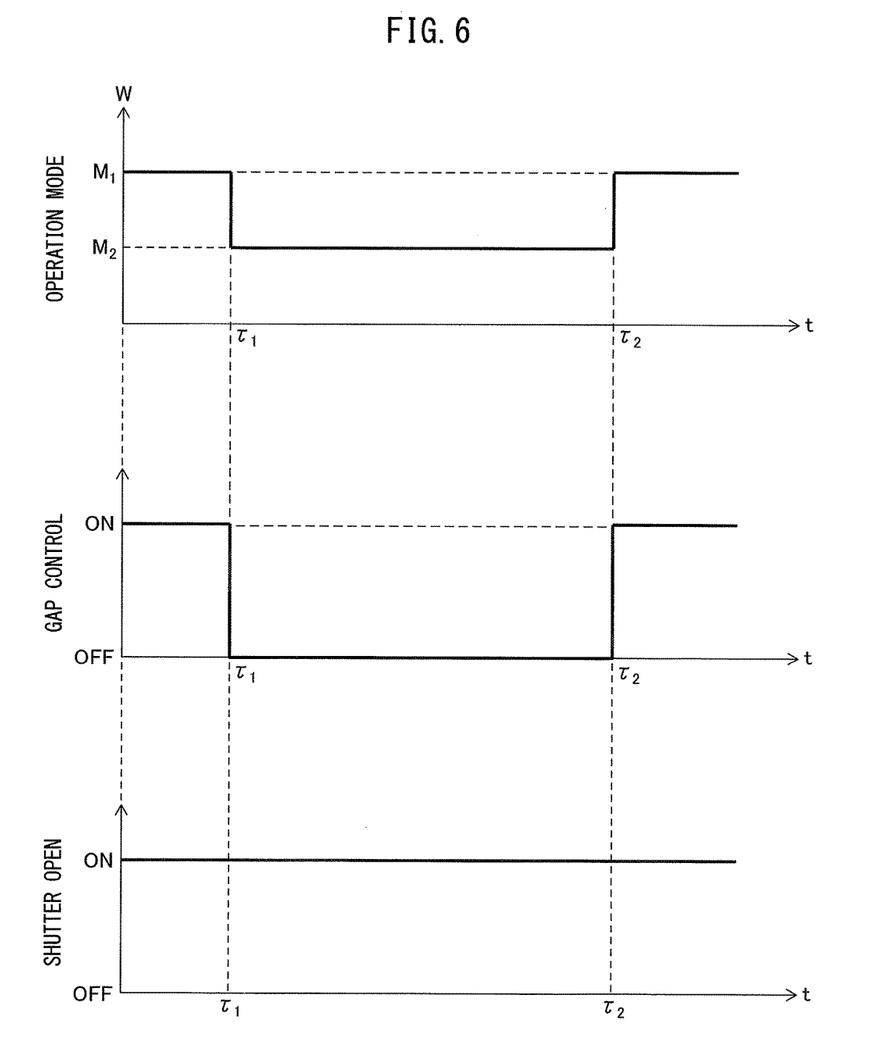
FIG. 6 is a timing chart illustrating the operation of the laser processing system shown in FIG. 1 by time series.

FIG. 6 is a timing chart showing the above-mentioned operation of the laser processing system 10 by time series. At the time point $T_1$, the controller 16 switches the operation mode of the laser oscillator 12 from the standard-standby mode $M_1$ to the energy saving mode $M_2$ (step S2). Along with this, the controller 16 switches the gap control from "ON" to "OFF" in order to stop the gap control.

Then, at the time point $\tau_2$, the controller 16 receives the gap control start command (i.e., determines "YES" at step S5), and switches the operation mode of the laser oscillator 12 from the energy saving mode $M_2$ to the standard-standby mode $M_1$ (step S6). Along with this, the controller 16 switches the gap control from "OFF" to "ON", and starts the flow shown in FIG. 5.

In this embodiment, the controller 16 can make the shutter 30 continuously open (i.e., shutter open "ON") over the operating period of the laser processing system 10 including the time point $\tau_1$ and $\tau_2$ (i.e., the period when steps S1 to S10 of FIG. 3 are executed).

This operation will be explained below. In this embodiment, the irradiation position of the laser light 36 irradiated onto the workpiece W is arranged at the process start point by step S4, and then the operation mode is switched from the energy saving mode $M_2$ to the standard-standby mode $M_1$ at step S6, as stated above.

In this case, laser light 36 having laser power corresponding to the standard-standby mode is irradiated onto the process start point, thereby the process start point is pierced.

However, since the process start point is arranged at the non-product region not to be a product, the quality of the final product is not influenced even if the process start point is pierced at this time.

In this way, according to this embodiment, it is possible to omit the operation of opening and closing the shutter 30 at the time when executing steps S2 and S6 (i.e., at the time points $\tau_1$ and $\tau_2$), as shown in FIG. 6. Due to this, since the time needed for opening and closing the shutter 30 can be shortened, the cycle time of the operation flow of the laser processing system 10 can be shortened.

Further, according to this embodiment, since the shutter 30 can be left in the opened state for the time period when the flow shown in FIG. 3 is executed, it is possible to omit the shutter 30 itself depending on the laser processing command included in the processing program. In this case, the manufacturing costs of the laser processing system 10 can be slashed.

Further, in this embodiment, the controller 16 switches the operation mode of the laser oscillator 12 from the energy saving mode to the standard-standby mode and starts the base discharge when receiving the gap control start command.

According to this configuration, it is possible to execute the gap control of step S7 and the preparatory operation for piercing in steps S8 and S9, in parallel with switching the operation mode to the standard-standby mode (i.e., the start of the base discharge). Due to this, the cycle time of the operation flow of the laser processing system 10 can be shortened effectively.

Note that, in the above-mentioned embodiment, after the nozzle 46 is retracted in a direction away from the table 40 at step S11, the position of the nozzle 46 is adjusted for adjusting the gap dimension at step S7.

However, steps S11 and step S7 may be omitted. Such an operation flow will be explained below with reference to FIG. 7 and FIG. 8. Note that, in the flow shown in FIG. 7 and FIG. 8, processes similar to the above-mentioned embodiment will be assigned the same step numbers, and detailed explanations thereof will be omitted.

Figure 8:
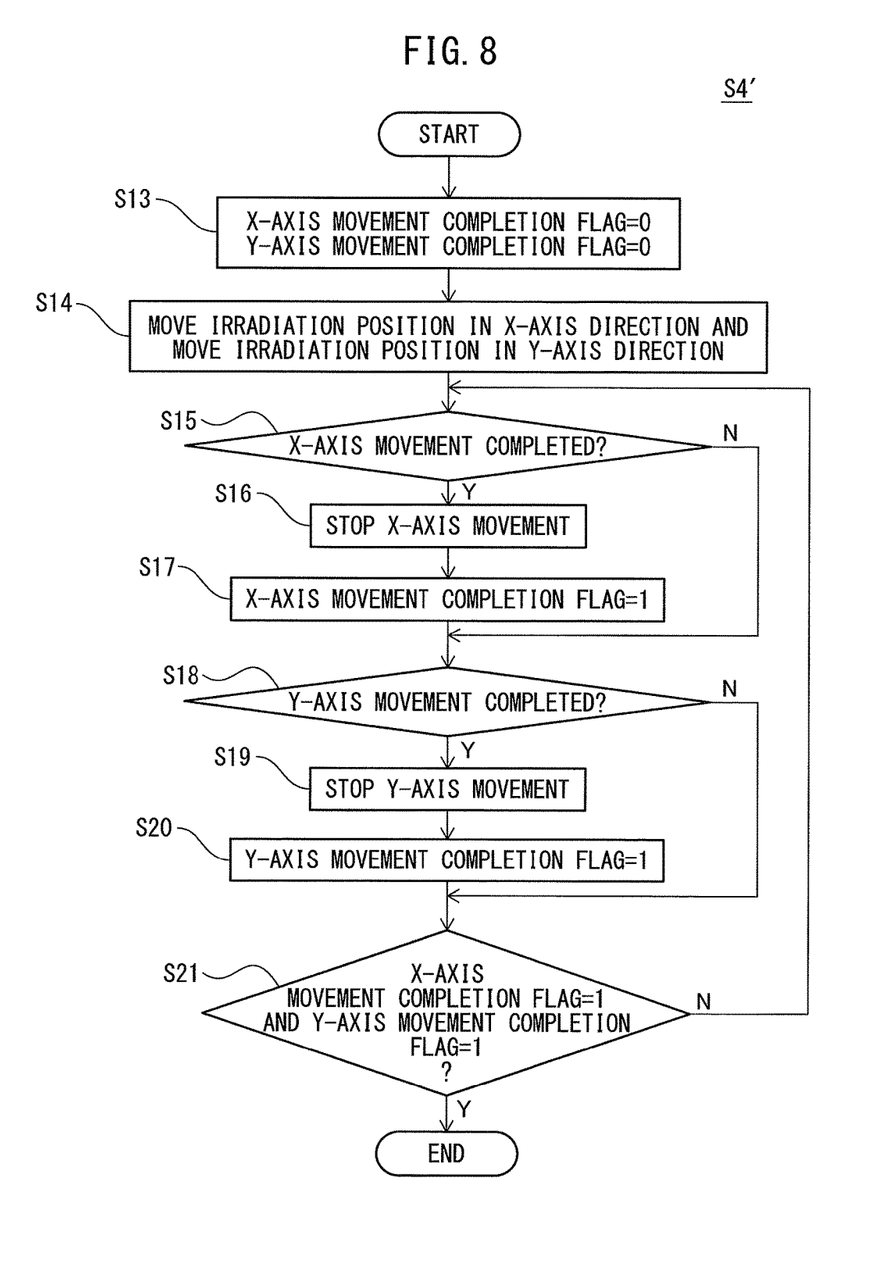
FIG. 8 is a flow chart illustrating the operation flow of step S4' in FIG. 7.

At step S4', the controller 16 arranges the irradiation position of laser light 36 emitted from the laser processing machine 14 onto the workpiece W at the process start point. Referring to FIG. 8, the controller 16 executes steps S13 to S21 after step S4', without executing the above-mentioned steps S11 and S12.

Referring again to FIG. 7, when the controller 16 determines that it has received the piercing command (i.e., determines "YES") at step S8 after step S4', at step S6, the controller 16 switches the operation mode of the laser oscillator 12 from the energy saving mode to the standard-standby mode. Then, at step S9, the controller 16 executes the piercing.

In this way, in this embodiment, the controller 16 switches the operation mode of the laser oscillator 12 from the energy saving mode to the standard-standby mode by a trigger of the receipt of the piercing command.

In this embodiment, since laser light 36 is irradiated onto the process start point when the operation mode is switched from the energy saving mode to the standard-standby mode, it is possible to omit the operation of opening and closing the shutter 30 when steps S2 and S6 are executed. Due to this, the cycle time of the operation flow of the laser processing system 10 can be shortened.

Figure 7:
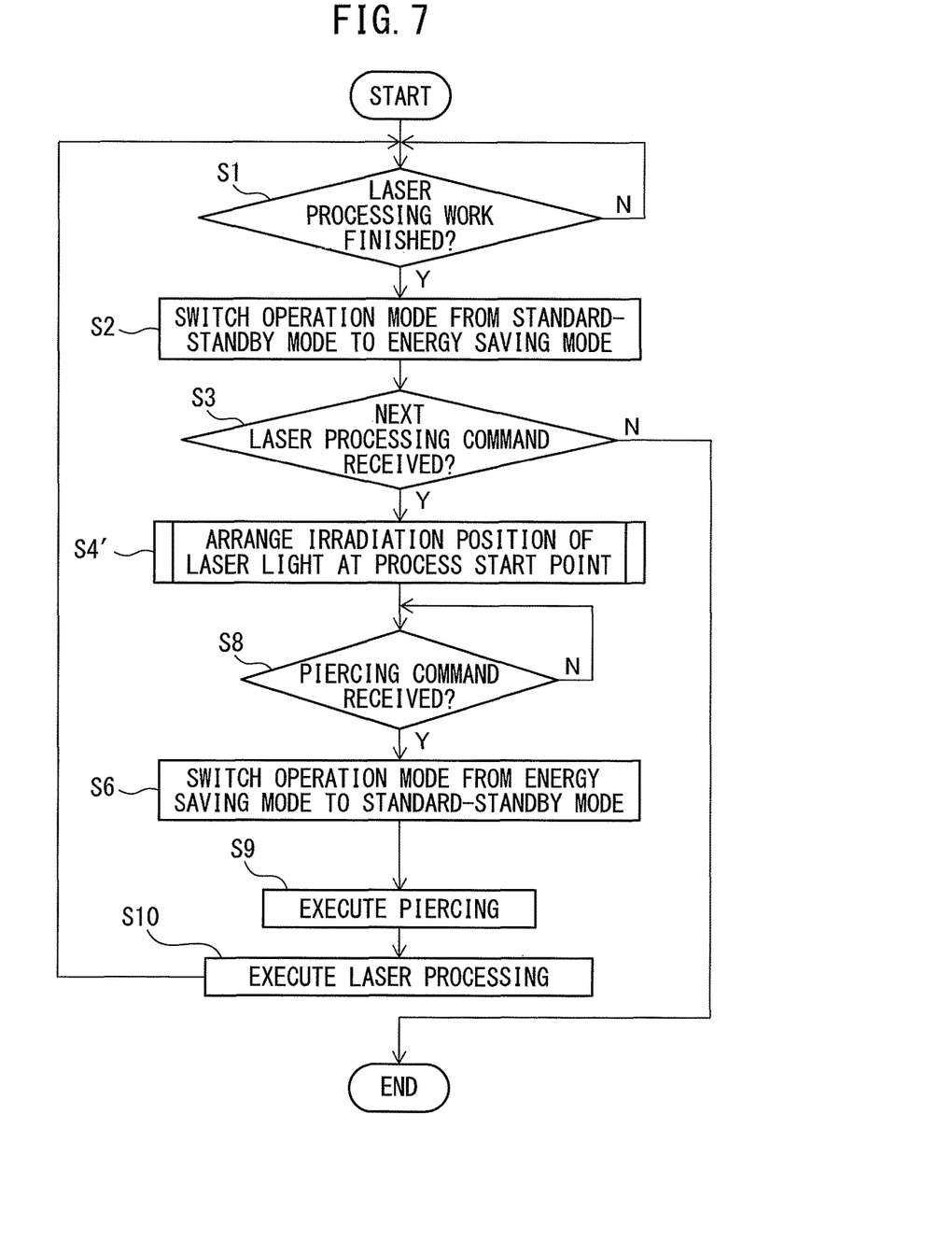
FIG. 7 is a flow chart illustrating another example of the operation flow of the laser processing system shown in FIG. 1.

Further, according to this embodiment, it is possible to omit the shutter 30 since the shutter 30 can be opened for the time period when the flow shown in FIG. 7 is executed. In this case, the manufacturing costs of the laser processing system 10 can be slashed.

Further, according to this embodiment, it is possible to execute the preparatory operation for piercing in step S9 in parallel with switching the operation mode to the standard-standby mode (i.e., the start of the base discharge). Accordingly, the cycle time of the operation flow of the laser processing system 10 can be shortened.

Note that, the operation flows shown in FIG. 3 and in FIG. 7 can be combined so as to execute steps S6 to S8 in FIG. 3 and steps S8 and S6 in FIG. 7 in parallel. Below, such an operation flow will be explained with reference to FIG. 9. Note that, processes similar to the above-mentioned embodiments will be assigned the same step numbers, and detailed explanations thereof will be omitted.

Figure 9:
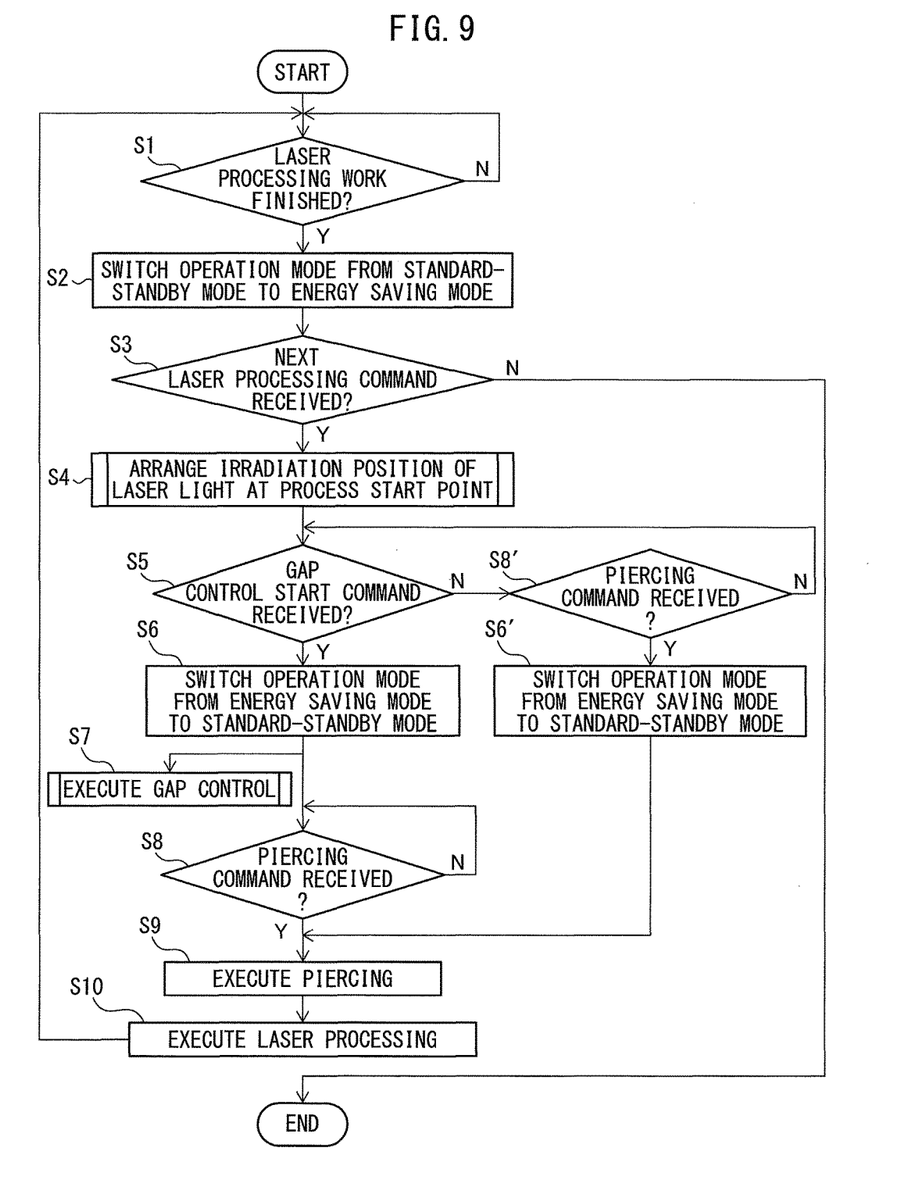
FIG. 9 is a flow chart illustrating still another example of the operation flow of the laser processing system shown in FIG. 1.

In the operation flow according to this embodiment, when determined "NO" at step S5, at step S8', the controller 16 determines whether it has received the piercing command. The controller 16 proceeds to step S6' when determined "YES" at step S8', while it returns to step S5 when determined "NO" at step S8'.

At step S6', the controller 16 switches the operation mode of the laser oscillator 12 from the energy saving mode to the standard-standby mode. Then, the controller 16 proceeds to step S9. In this way, in the operation flow according to this embodiment, the controller 16 executes steps S6 to S8 in FIG. 3 or steps S8 and S6 in FIG. 7, depending on the judgment at step S5.

Note that, in the above-mentioned embodiments, the controller 16 switches the operation mode of the laser oscillator 12 between the energy saving mode and the standard-standby mode. However, the controller 16 may switch the operation mode between the energy saving mode and a high power mode, or between the standard-standby mode and the high power mode.

The high power mode is an operation mode for making the laser oscillator 12 execute the main discharge. In this high power mode, the controller 16 sends a command to the discharge power source 28 so as to supply voltage to the main electrodes of the first discharge tube 24 and the second discharge tube 26.

As a result, the main discharge is generated at the first discharge tube 24 and the second discharge tube 26. The power consumption at the laser oscillator 12 in the high power mode is larger than that in the standard-standby mode.

Further, in the above-mentioned embodiments, the movement mechanism 48 moves the table 44 in the x-axis direction and y-axis direction, thereby moves the irradiation position of laser light on the workpiece W relatively in the x-axis direction and y-axis direction.

However, the movement mechanism may be configured to move the table 44 in only one of the x-axis direction and y-axis direction. Alternatively, the movement mechanism may be configured so as to move the nozzle 46 in at least one of the x-axis direction and y-axis direction, while the table 44 is fixed.

Above, embodiments of the invention were used to explain the invention, but the above embodiments do not limit the inventions according to the claims. Further, combinations of the features which are explained in the embodiments of the invention may also be included in the technical scope of the invention. However, not all of the combinations of these features are necessarily essential for the solution of the invention. Further, the fact that the above embodiments can be changed or improved in various ways would be clear to a person skilled in the art.

Further, it should be noted that the operations, routines, steps, processes, stages, and other processing in the devices, systems, programs, and methods shown in the claims, specification, and drawings, unless particularly clearly indicated by "before", "in advance of", etc. or the output of prior processing being used for later processing, can be realized in any order. In the flow of operations in the claims, specification, and drawings, even if explained using "first", "next", "then", etc. for convenience, this does not mean the execution in this order is essential.

The invention claimed is:

1. A laser processing system comprising:
   a laser oscillator configured to generates laser light;
   a laser processing machine configured to irradiates laser light generated by the laser oscillator onto a workpiece so as to process the workpiece, the laser processing machine including a movement mechanism configured to move an irradiation position of laser light on the workpiece;
   a mode switching part configured to switches an operation mode which determines an electric power supplied to the laser oscillator between (1) a standard-standby mode for making the laser oscillator carry out a base discharge to generate laser light having a smaller laser power than a main discharge prior to a laser processing and (2) an energy saving mode in which the base discharge and the main discharge are stopped such that the power consumption is smaller than that in the standard-standby mode,
   a movement controller configured to control the movement mechanism so as to arrange the irradiation position at a process start point arranged at a non-product region of the workpiece other than a product region of the workpiece used as a product; and
   a switching controller configured to control the mode switching part so as to switch the operation mode from the energy saving mode to the standard-standby mode when the irradiation position is arranged at the process start point.

2. The laser processing system according to claim 1, wherein the laser processing machine includes:
   a table on which the workpiece is placed; and
   a nozzle configured to emits laser light generated by the laser oscillator toward the table, wherein
   the movement mechanism moves the nozzle and the table relative to each other.

3. A laser processing system comprising:
   a laser oscillator configured to generate laser light;
   a laser processing machine configured to irradiate laser light generated by the laser oscillator onto a workpiece so as to process the workpiece, the laser processing machine including a movement mechanism configured to move an irradiation position of laser light on the workpiece;
   a mode switching part configured to switch an operation mode which determines an electric power supplied to the laser oscillator between a standard-standby mode for making the laser oscillator carry out a base discharge prior to a laser processing and an energy saving mode in which the power consumption is smaller than that in the standard-standby mode,
   a movement controller configured to control the movement mechanism so as to arrange the irradiation position at a process start point arranged at a non-product region of the workpiece other than a product region of the workpiece used as a product; and a switching controller configured to control the mode switching part so as to switch the operation mode from the energy saving mode to the standard-standby mode when the irradiation position is arranged at the process start point, wherein the laser processing machine includes:
a table on which the workpiece is placed; and
a nozzle configured to emit laser light generated by the laser oscillator toward the table, wherein the movement mechanism moves the nozzle and the table relative to each other, wherein the switching controller switches the operation mode from the energy saving mode to the standard-standby mode when receiving a gap control start command for starting to control a gap dimension between the nozzle and the table.

4. A laser processing system comprising:
a laser oscillator configured to generate laser light;
a laser processing machine configured to irradiate laser light generated by the laser oscillator onto a workpiece so as to process the workpiece, the laser processing machine including a movement mechanism configured to move an irradiation position of laser light on the workpiece;

a mode switching part configured to switch an operation mode which determines an electric power supplied to the laser oscillator between a standard-standby mode for making the laser oscillator carry out a base discharge prior to a laser processing and an energy saving mode in which the power consumption is smaller than that in the standard-standby mode, a movement controller configured to control the movement mechanism so as to arrange the irradiation position at a process start point arranged at a non-product region of the workpiece other than a product region of the workpiece used as a product; and a switching controller configured to control the mode switching part so as to switch the operation mode from the energy saving mode to the standard-standby mode when the irradiation position is arranged at the process start point, wherein the switching controller switches the operation mode from the energy saving mode to the standard-standby mode when receiving a piercing command for piercing a hole at the process start point by laser light.

5. A laser processing system comprising:
a laser oscillator configured to generate laser light;
a laser processing machine configured to irradiate laser light generated by the laser oscillator onto a workpiece so as to process the workpiece, the laser processing machine including:
a movement mechanism configured to move an irradiation position of laser light on the workpiece; and
a shutter configured to opens and closes a path of laser light emitted from the laser oscillator;

a mode switching part configured to switch an operation mode which determines an electric power supplied to the laser oscillator between a standard-standby mode for making the laser oscillator carry out a base discharge prior to a laser processing and an energy saving mode in which the power consumption is smaller than that in the standard-standby mode, a movement controller configured to control the movement mechanism so as to arrange the irradiation position at a process start point arranged at a non-product region of the workpiece other than a product region of the workpiece used as a product;

a switching controller configured to control the mode switching part so as to switch the operation mode from the energy saving mode to the standard-standby mode when the irradiation position is arranged at the process start point; and a shutter controller configured to control an operation of the shutter, wherein the shutter controller does not close the shutter when the operation mode is switched from the energy saving mode to the standard-standby mode.

* * * * *

UNITED STATES PATENT AND TRADEMARK OFFICE
CERTIFICATE OF CORRECTION

PATENT NO. : 10,065,268 B2
APPLICATION NO. : 15/085218
DATED : September 4, 2018
INVENTOR(S) : Kazuhiro Suzuki It is certified that error appears in the above-identified patent and that said Letters Patent is hereby corrected as shown below:

In the Claims

Claim 1, Column 12, Line 16, delete "generates" and insert -- generate --

Claim 1, Column 12, Line 17, delete "irradiates" and insert -- irradiate --

Claim 1, Column 12, Line 23, delete "switches" and insert -- switch --

Signed and Sealed this
Eighth Day of January, 2019

Andrei Iancu
*Director of the United States Patent and Trademark Office*